United States Patent
Richardson

(10) Patent No.: US 7,422,666 B2
(45) Date of Patent: Sep. 9, 2008

(54) PHOTOVOLTAICALLY POWERED CATHODIC PROTECTION SYSTEM FOR AUTOMOTIVE VEHICLE

(75) Inventor: James Richardson, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 11/383,610

(22) Filed: May 16, 2006

(65) Prior Publication Data
US 2007/0267290 A1  Nov. 22, 2007

(51) Int. Cl.
*C23F 13/22* (2006.01)
(52) U.S. Cl. .............. 204/196.27; 204/196.11; 204/196.36; 204/196.37
(58) Field of Classification Search ........... 204/196.11, 204/196.27, 196.36, 196.37
See application file for complete search history.

(56) References Cited

U.S. PATENT DOCUMENTS

| | | | |
|---|---|---|---|
| 4,136,309 A * | 1/1979 | Galberth et al. ............ 320/102 |
| 5,008,062 A | 4/1991 | Anderson et al. |
| 5,366,604 A | 11/1994 | Stilley |
| 5,508,205 A | 4/1996 | Dominguez et al. |
| H001644 H * | 5/1997 | Muehl, Sr. ............. 204/196.05 |
| 6,559,373 B2 | 5/2003 | Choi et al. |
| 6,586,668 B2 | 7/2003 | Shugar et al. |
| 6,653,553 B2 | 11/2003 | Reimer |
| 2007/0158978 A1 * | 7/2007 | Woodhouse et al. ........ 296/210 |

* cited by examiner

*Primary Examiner*—Bruce F Bell
(74) *Attorney, Agent, or Firm*—Dickinson Wright PLLC; Greg Brown; Ray Coppiellie

(57) ABSTRACT

A photovoltaically powered cathodic protection system for an automotive vehicle uses electrical energy arising from a photovoltaic array positioned upon an exterior surface of the vehicle, with the cathodic protection current being controlled by a controller which is also connected with an electrical storage device and with at least one electrogalvanic cell sensor. The controller and associated sensors function to assure that sufficient charge passes through conductors applied to the body of the vehicle to maintain cathodic protection on a consistent basis.

7 Claims, 1 Drawing Sheet

PHOTOVOLTAICALLY POWERED CATHODIC PROTECTION SYSTEM FOR AUTOMOTIVE VEHICLE

BACKGROUND OF THE INVENTION

1. Field of the Invention

The present invention relates to a cathodic corrosion protection system for an automotive vehicle in which electrical energy required to power the cathodic system is provided by a photovoltaic array mounted upon an exterior surface of the vehicle. The system also includes a battery and a controller for monitoring the vehicle's electrical potential and for adjusting the applied anticorrosion voltage.

2. Disclosure Information

Cathodic protection of metallic structures has been used for many years. U.S. Pat. No. 5,366,604 illustrates a solar powered cathodic corrosion protection system for a buried structure. Cathodic protection for moveable structures, has, however, been generally confined to marine applications. Of course, a source of electrical current must be provided to power cathodic protection systems and this comes at the expense of an energy expenditure. Designers of cathodic protection systems have attempted to mitigate the energy consumption of such systems by using photovoltaic (PV) arrays which advantageously convert sunlight into electrical energy. Such PV powered cathodic protection, has, however, been used only for stationary structures such as that shown in the '604 patent.

A system according to the present invention advantageously uses a PV array with battery storage to power a cathodic protection system in an automotive vehicle, so as to prevent corrosion of the vehicle, particularly the vehicle's body, without the need for increasing the fuel consumed by the vehicle's power plant.

SUMMARY OF THE INVENTION

A photovoltaically powered cathodic protection system for an automotive vehicle includes a photovoltaic array adapted for mounting upon an exterior surface of the vehicle, with the array having first and second load terminals, and first and second conductors adapted to extend from the first and second terminals to first and second portions of the vehicle. The first and second portions of the vehicle are physically separated and generally comprise portions of a welded metallic body of the vehicle. Because metallic bodies used in automotive vehicles are generally joined together by means of welding, numerous conduction paths are created between the various stampings which encompass the vehicle's body. Although this is particularly the case where unitized construction is utilized, vehicles having separate frame/body construction also use welded metal bodies and metal frames, with the body and frame of each vehicle having numerous electrical interconnects. As a result, excellent electrical conduction between the various parts of a vehicle body or combined body/frame may be achieved by the present system, so as to produce a high level of cathodic corrosion protection.

The present photovoltaically powered cathodic protection system also preferably includes an electrical storage device which may be embodied as a battery or ultracapacitor, or other type of storage device known to those skilled in the art and suggested by this disclosure. A controller, operatively connected with the electrical storage device, with the photovoltaic array, and with several body sensors, controls the current flowing through the first and second conductors and through the vehicle body or chassis.

According to another aspect of the present invention, a method for providing cathodic protection for the body of an automotive vehicle includes the steps of providing a photovoltaic array located upon an exterior surface of the vehicle's body, with the array having a plurality of connecting terminals, and providing a plurality of conductors extending between the connecting terminals and distributed portions of the vehicle's body. The method also includes providing an electrical storage device operatively bonded to the connecting terminals of the array, as well as providing a controller which is operatively associated with the array and the electrical storage device, and which controls the flow of current from the array and the electrical storage device through the vehicle body. In the event that the storage device has accumulated charge in excess of a predetermined threshold charge, the entire current flowing from the array will be available to flow through the vehicle body. According to another aspect of the present invention, both primary and secondary grounding may be employed. Primary grounding may be accomplished through the vehicle's tires, and secondary grounding would be through a centralized grounding point upon the vehicle body itself.

It is an advantage of a method and system according to the present invention that active cathodic protection may be provided for an automotive vehicle without the need for the increased consumption of fuel which would otherwise be required to generate the electrical current associated with the cathodic protection.

It is a further advantage of the present system that the use of cathodic protection may allow a vehicle to be manufactured from more readily recyclable steels. In essence, the cathodic protection offered by the present inventive system will supplant certain anticorrosion coatings on steels, and perhaps other metals, which would render these metals much less recyclable. For example, the use of galvanized coatings and other known coatings on cold rolled steel stock prevents the steel from being readily recycled, and this in turn causes an adverse economic impact upon both the manufacturer of the vehicle and the vehicle purchaser.

It is a further advantage of the present system that the system controller and sensors provide feedback from the vehicle body respecting applied voltage requirements, thereby permitting safe electrical discharge levels.

Other advantages, as well as objects and features of the present invention, will become apparent to the reader of this specification.

DETAILED DESCRIPTION OF THE PREFERRED EMBODIMENTS

Figure 1:
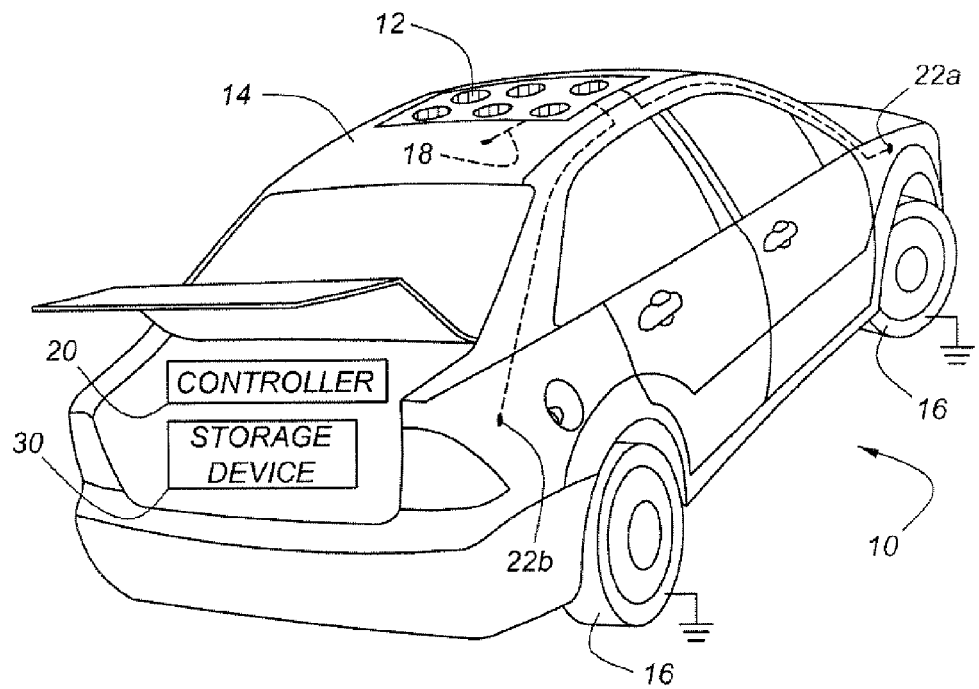
FIG. 1 is a perspective view of a vehicle having a cathodic protection system according to the present invention.

Vehicle 10, as shown in FIG. 1, has a metallic body system which may take the form of either a unitized body and frame system, or a separate body/frame architecture. Vehicle 10 has a photovoltaic array, 12, which is mounted to top 14 of vehicle 10. Array 12 may comprise either an integrated photovoltaic appliqué, a sunroof or clear roof module with integrated solar collectors, or an additional panel applied over top 14. A first conductor, 18, is connected to top 14, which serves as a convenient central location for the bonding of first conductor 18 to the vehicle. Second conductors 22a and 22b extend from PV sunroof 12 to more remote, or distributed, or separated locations of vehicle 10. Thus, second conductor 22a extends to a forward portion of vehicle body, whereas conductor 22b extends to a rear quarter of vehicle 10. The purpose of the various conductors 18 and 22 is to assure that the desired electric current reaches each required portion within the metallic structure of vehicle 10. A primary system ground is established through tires 16, and a secondary ground is established through the vehicle's chassis or body ground, which is commonly the point at which the vehicle's starting battery is grounded.

Those skilled in the art will appreciate in view of this disclosure that PV sunroof 12, could comprise either a vitreous or non-vitreous sunroof, or other type of fixed or movable panel, or other solar collection materials integrated, dispersed, applied, or film applied to the surface, or an appliqué positioned upon exterior top panel 14 of vehicle 10, so as to present a ready target for the impingement of solar energy upon the PV array.

FIG. 1 further shows controller 20 and electrical storage device 30, which may be mounted within vehicle 10 in any convenient location. The functions of these devices will be explained in conjunction with FIG. 2, below.

Figure 2:
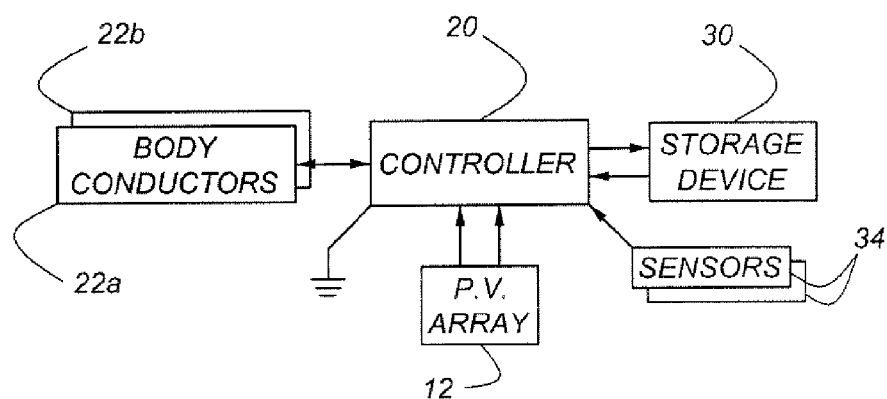
FIG. 2 is a block diagram showing the component parts of a cathodic protection system according to the present invention.

As shown in FIG. 2, controller 26, is connected with body conductors 22a and 22b, as well as with a storage device 30, and with PV array 12. Controller 26 is grounded to both the vehicle body and through tires 16. Storage device 30 may be drawn from a plurality of such devices as storage batteries, ultracapacitors, and other devices commonly used for storing electrical energy. Storage device 30 may be operatively connected with a central electrical storage device in vehicle 10. A primary function of controller 26 is to place an electrical potential across a vehicle's body sufficient to produce active cathodic protection, while providing a voltage adjusted according to feedback from at least one corrosion cell sensor, 34. Sensors 34 (FIG. 2) may include several nanosensors located at various locations having a greater likelihood of being affected by electrogalvanic corrosion. Sensors 34 will sense the presence of an active electrogalvanic cell by sensing the microcurrent and/or voltage associated with such a cell. A number of sensors 34 may be employed to provide feedback to controller 20 regarding the corrosion potentials of various portions of the vehicle's body. In this manner, an appropriate anti-corrosion current may be applied to each of the defined portions.

Controller 26 functions to maintain storage device 30 in a suitably charged state to assure that cathodic protection may continue during periods in which current generated by PV array 12 is insufficient to power the cathodic protection system at the desired level, such as at night or during overcast days. When storage device 30 is charged to a level exceeding a predetermined threshold, controller 26 may be programmed to direct the entirety of the current flowing from PV array 12 to conductors 22a and 22b. In this manner, cathodic protection may be provided on a consistent basis, but without adversely impacting the fuel economy of vehicle 10.

As an alternative to the previously described system, storage device 30 may be charged by means of an installed vehicular electrical system. Although such an arrangement would avoid the first cost of PV array 12, increased fuel consumption would be ongoing.

Although the present invention has been described in connection with particular embodiments thereof, it is to be understood that various modifications, alterations, and adaptations may be made by those skilled in the art without departing from the spirit and scope of the invention set forth in the following claims.

What is claimed:

1. A photovoltaically powered cathodic protection system for an automotive vehicle, comprising:
    a photovoltaic array adapted for mounting upon an exterior surface of a vehicle with said array having first and second load terminals;
    a first conductor adapted to extend from said first terminal of said photovoltaic array to a first portion of a vehicle;
    a second conductor adapted to extend from said second terminal of said photovoltaic array to a second portion of said vehicle;
    an electrical storage device connected with said first and second terminals of said photovoltaic array; and
    a controller, operatively connected with said electrical storage device and said photovoltaic array, for controlling the current flowing through said first and second conductors, with said controller being operatively connected with at least one sensor for sensing the presence of an active electrogalvanic cell within a vehicle.

2. A photovoltaically powered cathodic protection system according to claim 1, wherein said first portion of a vehicle and said second portion of a vehicle are physically separated.

3. A photovoltaically powered cathodic protection system according to claim 1, wherein said electrical storage device comprises a battery.

4. A photovoltaically powered cathodic protection system according to claim 1, wherein said electrical storage device comprises an ultracapacitor.

5. A cathodic corrosion protection system for an automotive vehicle, comprising:
    an electrical power source having first and second load terminals;
    a first conductor adapted to extend from said first terminal of said electrical power source to an electrical ground within a vehicle;
    a second conductor adapted to extend from said second terminal of said electrical power source to a second portion of said vehicle, whereby a protective current will be established in a vehicle; and
    a controller for controlling said protective current, and at least one sensor, operatively connected with said controller, for sensing the presence of an active electrogalvanic cell within a vehicle.

6. A cathodic protection system according to claim 5, wherein said electrical power source comprises a photovoltaic array and an electrical storage device operatively connected with said photovoltaic array.

7. A cathode protection system according to claim 5, wherein said electrical power source comprises an electrical storage device.

* * * * *